(12) United States Patent
Wang et al.

(10) Patent No.: US 11,500,735 B2
(45) Date of Patent: Nov. 15, 2022

(54) DYNAMIC OPTIMIZATION OF BACKUP POLICY

(71) Applicant: EMC IP Holding Company LLC, Hopkinton, MA (US)

(72) Inventors: Wei Wang, Chengdu (CN); Boda Lei, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 16/807,191

(22) Filed: Mar. 3, 2020

(65) Prior Publication Data

US 2021/0117283 A1 Apr. 22, 2021

(30) Foreign Application Priority Data

Oct. 18, 2019 (CN) ......................... 201910993270.X

(51) Int. Cl.
*G06F 11/14* (2006.01)
*H04L 67/1004* (2022.01)
*G06F 16/901* (2019.01)

(52) U.S. Cl.
CPC ...... *G06F 11/1461* (2013.01); *G06F 11/1451* (2013.01); *G06F 11/1464* (2013.01); *G06F 16/9024* (2019.01); *H04L 67/1004* (2013.01)

(58) Field of Classification Search
CPC ............ G06F 11/1461; G06F 11/1451; G06F 11/1464; G06F 16/9024; G06F 11/3433; G06F 11/1466; G06F 16/122; H04L 67/1004; H04L 67/1002; H04L 67/26
See application file for complete search history.

(56) References Cited

U.S. PATENT DOCUMENTS

| | | | | | |
|---|---|---|---|---|---|
| 6,104,962 | A | * | 8/2000 | Sastry | G05B 19/0426 700/20 |
| 2009/0172322 | A1 | * | 7/2009 | Gilpin | G06F 11/1464 711/162 |
| 2009/0300633 | A1 | * | 12/2009 | Altrichter | G06F 9/4856 711/E12.001 |
| 2009/0307283 | A1 | * | 12/2009 | Lehr | G06F 11/1461 |
| 2017/0132089 | A1 | * | 5/2017 | Roehrsheim | G06F 16/113 |
| 2020/0264787 | A1 | * | 8/2020 | Abdul Kadar | G06F 3/0653 |

* cited by examiner

*Primary Examiner* — Gautam Sain
*Assistant Examiner* — Wei Ma
(74) *Attorney, Agent, or Firm* — Chamberlain, Hrdlicka, White, Williams & Aughtry

(57) ABSTRACT

Embodiments of the present disclosure provide a method of backup management, an electronic device and a computer program product. The method comprises: determining a plurality of candidate backup policies for a plurality of clients of a data backup system, determining an expected load balance degree with respect to time for the data backup system to perform data backups for the plurality of clients using the plurality of candidate backup policies, determining an actual load balance degree with respect to time for the data backup system while the data backup system is performing the data backups for the plurality of clients using a plurality of current backup policies, and selecting a plurality of backup policies to be used for the plurality of clients respectively, based on a comparison of the expected load balance degree and the actual load balance degree.

17 Claims, 6 Drawing Sheets

DYNAMIC OPTIMIZATION OF BACKUP POLICY

CROSS-REFERENCE TO RELATED APPLICATIONS

This application claims benefit to Chinese Patent Application 201910993270.X filed on Oct. 18, 2019. Chinese Patent Application 201910993270.X is hereby incorporated by reference in its entirety.

FIELD

Embodiments of the present disclosure generally relate to computer systems or storage systems, and more particularly to a method of backup management, an electronic device and a computer program product.

BACKGROUND

Currently, in data backup and data protection products, backup policies are generally set up by system administrators based on their experience. Normally, a group of clients are added into a certain backup policy, and then backup jobs for all the clients under the backup policy can be triggered simultaneously at a scheduled backup start time. As the assignment of clients to backup policies is either static or dynamic depending on rules of the backup policies, there is no way to automatically balance the clients among the backup policies when the data backup system is running, in order to improve a load balance degree of the data backup system with respect to time and meanwhile keeping the Recover Point Objective (RPO) of the clients.

If the assignment of clients in different backup policies is imbalanced, serious problems may occur when the data backup system is running, thereby reducing the performance of the data backup system and resulting in a poor user experience.

SUMMARY

Embodiments of the present disclosure relate to a method of backup management, an electronic device and a computer program product.

In a first aspect of the present disclosure, there is provided a method of backup management. The method comprises: determining a plurality of candidate backup policies for a plurality of clients of a data backup system respectively. The method also comprises: determining an expected load balance degree with respect to time for the data backup system to perform data backups for the plurality of clients using the plurality of candidate backup policies respectively. The method also comprises: determining an actual load balance degree with respect to time for the data backup system while the data backup system is performing the data backups for the plurality of clients using a plurality of current backup policies respectively. The method further comprises: selecting, between the plurality of candidate backup polices and the plurality of current backup policies, a plurality of backup policies to be used for the plurality of clients respectively, based on a comparison of the expected load balance degree and the actual load balance degree.

In a second aspect of the present disclosure, there is provided an electronic device. The electronic device comprises at least one processor and at least one memory storing computer program instructions. The at least one memory and the computer program instructions are configured, with the at least one processor, to cause the electronic device to: determine a plurality of candidate backup policies for a plurality of clients of a data backup system respectively. The at least one memory and the computer program instructions are also configured, with the at least one processor, to cause the electronic device to: determine an expected load balance degree with respect to time for the data backup system to perform data backups for the plurality of clients using the plurality of candidate backup policies respectively. The at least one memory and the computer program instructions are also configured, with the at least one processor, to cause the electronic device to: determine an actual load balance degree with respect to time for the data backup system while the data backup system is performing the data backups for the plurality of clients using a plurality of current backup policies respectively. The at least one memory and the computer program instructions are further configured, with the at least one processor, to cause the electronic device to: select, between the plurality of candidate backup polices and the plurality of current backup policies, a plurality of backup policies to be used for the plurality of clients respectively, based on a comparison of the expected load balance degree and the actual load balance degree.

In a third aspect of the present disclosure, there is provided a computer program product tangibly stored on a non-volatile computer readable medium and comprising machine-executable instructions. The machine-executable instructions, when being executed, cause the machine to perform the steps of the method according to the first aspect.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

The above and other objectives, features, and advantages of example embodiments of the present disclosure will become more apparent from the following detailed description with reference to the accompanying drawings. In the figures, several embodiments of the present disclosure are illustrated in an exemplary but non-restrictive manner.

Throughout all figures, identical or like reference numbers are used to represent identical or like components.

DETAILED DESCRIPTION OF EMBODIMENTS

Figure 1:
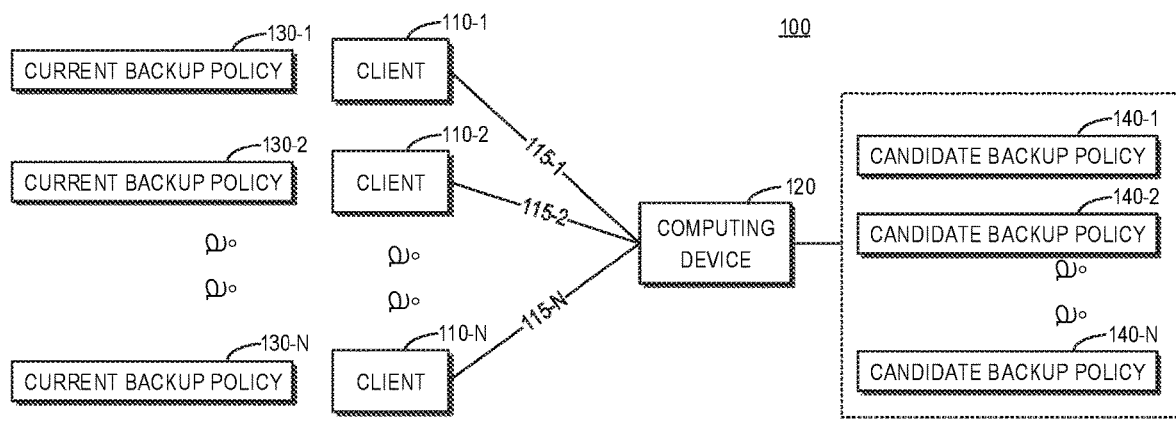
FIG. 1 illustrates a schematic diagram of a data backup system environment in which embodiments of the present disclosure may be implemented.

The principles and spirit of the present disclosure are described below with reference to several exemplary embodiments shown in the figures. It should be appreciated that these embodiments are only intended to enable those skilled in the art to better understand and implement the present disclosure, not to limit the scope of the present disclosure in any manner.

As mentioned above, if the assignment of clients in different backup policies is imbalanced, serious problems may occur when a data backup system is running, thereby reducing the performance of the backup system and resulting in a poor user experience. Specifically, in a certain time range, the data backup system may be overloaded by triggering too many backup jobs at the same time, so the backup jobs may accumulate in the data backup system, finally lowering the stability of the data backup system and causing some clients to possibly miss the recover point objective. On the other hand, in another time range, the load of the data backup system may be too low, which causes the resources of the data backup system not to be efficiently used.

In a traditional backup policy setting method, clients assigned to a backup policy are determined based on the administrator's experience. After clients are assigned to backup policies, the data backup system cannot continuously optimize the assignment of the clients to the backup policies according to the execution durations of backup jobs. In a case where the clients in different backup policies are not balanced, the data backup system cannot automatically perform an adjustment, nor can it notify the user. Therefore, in most cases, the performance of the data backup system may drop dramatically, and the data backup system can even crash sometimes.

In view of the above problems and potential other problems in the traditional solutions, embodiments of the present disclosure propose a technical solution for backup management. In the embodiments of the present disclosure, a new method may be employed to dynamically balance clients in different backup policies, thereby maximizing the service level of clients while effectively using resources of the data backup system.

In some embodiments, the proposed balance algorithm may evaluate an actual load balance degree of the data backup system under current backup policies, based on archived (namely, historical) backup job execution data. Then, the data backup system may determine a degree of suitability of each backup policy for each client according to several factors, and perform a simulation to assign clients to candidate backup policies, so that a sum of the degrees of suitability related to all the clients and their respective candidate backup policies is maximized. Next, the data backup system may determine an expected load balance degree of the data backup system under the candidate backup policies according to the simulation. If the expected load balance degree is better than the current actual load balance degree, the data backup system may assign the candidate backup policies to the clients for practical use in the data backup system.

Compared with the traditional solution of the data backup system, the embodiments of the present disclosure can dynamically optimize the assignment of clients to backup policies, to ensure that the load of the data backup system in backup time windows of the backup policies is balanced. Further, in various embodiments, the data backup system may also guarantee the backup performance for the clients, such as recover point objectives. In addition, the embodiments of the present disclosure may also provide a reasonable way to measure the balance degree of the data backup system in terms of backup policy. Some example embodiments of the present disclosure are described in detail below with reference to FIG. 1 through FIG. 5B.

FIG. 1 illustrates a schematic diagram of a data backup system environment 100 in which embodiments of the present disclosure may be implemented. As used herein, the data backup system environment 100 may also be referred to as a data backup system 100, which may include a plurality of clients 110-1, 110-2, . . . , 110-N that accept data backup services, where N is a natural number. In the following, for ease of description, the plurality of clients 110-1, 110-2, . . . , 110-N may also be collectively referred to as a plurality of clients 110 or clients 110. As used herein, a client (also referred to as an "asset" herein) may generally include data objects protected by a data protection system, for example, a file system, a database, a virtual machine disk, or the like on a target machine.

In order to perform data backups, the plurality of clients 110-1, 110-2, . . . , 110-N may be connected to a computing device 120 that provides data backup services via communication links 115-1, 115-2, . . . , 115-N (hereinafter collectively referred to as the communication links 115), respectively. For example, the clients 110 may transfer the data or files to be backed up to the computing device 120 via the communication links 115, receive various control signals for performing data backups from the computing device 120, and perform any other suitable data communications with the computing device 120, or the like. In some embodiments, the computing device 120 may be a backup server, which may include various computers for backing up data or files. More generally, the backup server may include any computer or other computing device with a data backup function.

In order to control and manage data backups for respective clients 110, the computing device 120 may configure backup policies for the clients 110. Generally, a backup policy may be used to control data backup behaviors of a client. For example, a backup policy may specify the clients to which the backup policy is to be applied, a backup start time, a time window for performing a backup, a manner for performing a backup, a backup repetition cycle, a specific storage disk to which a backup is directed, and so on. Typically, the data backup system 100 may be provided with a plurality of different available backup policies. For ease of description below, these available backup policies may be referred to as available backup policy 1, available backup policy 2, . . . , available backup policy M, where M is a natural number. Therefore, the computing device 120 may select appropriate backup policies for the clients 110 from these available backup policies 1 to M.

In the scenario depicted in FIG. 1, the computing device 120 is using current backup policies 130-1, 130-2, . . . , 130-N (collectively referred to as the current backup policies 130) to perform data backups for the clients 110-1, 110-2, . . . , 110-N, respectively. Because different current backup policies 130 may have different backup start times and are applied to different clients, and backup execution time lengths for respective clients may also be different, the data backup system 100 may have different workloads at different time points. For example, at different time points, there may be different numbers of clients performing data backups simultaneously. As discussed above, if the load balance degree of the data backup system 100 with respect to time is low, the performance of the data backup system 100 may be affected.

For this reason, the computing device 120 may also determine candidate backup policies 140-1, 140-2, . . . , 140-N, hereinafter collectively referred to as candidate backup policies 140, for the clients 110-1, 110-2, . . . , 110-N, respectively. Then, the computing device 120 may determine whether the candidate backup policies 140 can improve the load balance degree of the data backup system 100 with respect to time. If the computing device 120 determines that the candidate backup policies 140 can improve the load balance degree of the data backup system 100 with respect to time, the computing device 120 may replace the current backup policies 130 with the candidate backup policies 140 to perform data backups for the clients 110. Conversely, if the computing device 120 determines that the candidate backup policies 140 cannot improve the load balance degree of the data backup system 100 with respect to time, the computing device 120 may continue to use the current backup policies 130 to perform data backups for the clients 110. In some example scenarios, the computing device 120 may periodically determine the candidate backup policies 140 for the clients 110 according to a certain period, so as to dynamically optimize the load balance degree of the data backup system 100.

In some embodiments, the clients 110 may refer to any device capable of generating data and accepting data backup services. In some embodiments, such a device includes, but is not limited to, a personal computer, a tablet computer, a laptop computer, a notebook computer, a netbook computer, any other type of computers, a cell phone or smartphone, a media player device, an e-book device, a mobile WiFi device, a wearable computing device, a wireless device, a mobile device, a user device, and any other type of electronic computing device.

In some embodiments, the computing device 120 may include any device capable of implementing a computing function and/or control function, including but not limited to, a special purpose computer, a general purpose computer, a general purpose processor, a microprocessor, a microcontroller or a state machine. The computing device 120 may also be implemented as an individual computing device or a combination of computing devices, for example, a combination of a Digital Signal Processor (DSP) and a microprocessor, a plurality of microprocessors, one or more microprocessors in conjunction with a DSP core, or any other such configuration. It is further noted that in the context of the present disclosure, the computing device 120 may also be referred to as an electronic device 120, and these two terms may be used interchangeably herein.

In some embodiments, the communication links 115 may be any form of connection or coupling capable of implementing data communications or control signal communications between the clients 110 and the computing device 120, including but not limited to, a coaxial cable, a fiber optic cable, a twisted pair, or wireless technology (such as infrared, radio, and microwave). In some embodiments, the communication links 115 may include, but not limited to, a network card, a hub, a modem, a repeater, a bridge, a switch, a router, and other devices for network connections, as well as various network connection lines, and wireless links, and so on. In some embodiments, the communication links 115 may include various types of buses. In other embodiments, the communication links 115 may include a computer network, a communication network, or other wired or wireless networks.

It should be understood that FIG. 1 only schematically illustrates units, modules or components in the data backup system environment 100 related to embodiments of the present disclosure. In practice, the data backup system environment 100 may also include other units, modules or components for other functions. Therefore, the embodiments of the present disclosure are not limited to the specific devices, units, modules or components depicted in FIG. 1, but are generally applicable to any system environment that may perform file or data backups.

Figure 2:
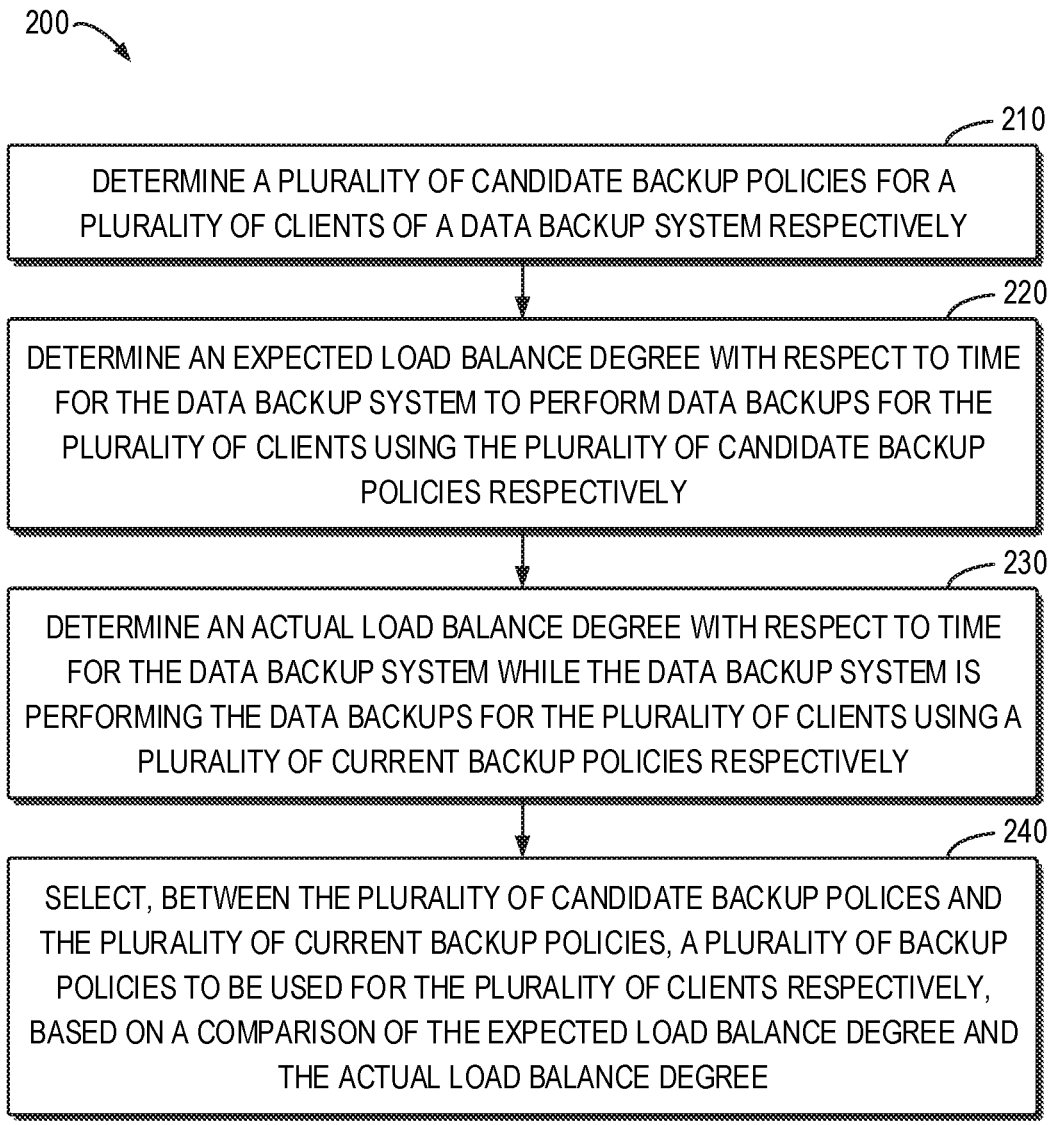
FIG. 2 illustrates a flowchart of an example backup management method according to an embodiment of the present disclosure.

FIG. 2 illustrates a flowchart of an example backup management method 200 according to an embodiment of the present disclosure. In some embodiments, the method 200 may be implemented by the computing device 120 in the data backup system 100, for example, by a processor or a processing unit of the computing device 120, or by various functional modules of the computing device 120. In other embodiments, the method 200 may also be implemented by a computing device independent from the data backup system 100, or may be implemented by other units or modules in the data backup system 100.

At 210, the computing device 120 determines a plurality of candidate backup policies 140-1 to 140-N for a plurality of clients 110-1 to 110-N of the data backup system 100, respectively. It should be noted that the computing device 120 may use any suitable manner to determine the plurality of candidate backup policies 140-1 to 140-N for the plurality of clients 110-1 to 110-N, respectively. For example, for each of the clients 110, the computing device 120 may randomly select a certain backup policy from the available backup policies 1 to M of the data backup system 100 as its candidate backup policy. Such a manner of randomly selecting a backup policy may simplify the processing process of the computing device 120 for determining the candidate backup policies, thereby reducing the processing overhead of the computing device 120.

Alternatively or additionally, when selecting the candidate backup policies 140 for respective clients 110, the computing device 120 may also consider a degree of suitability (also referred to as a matching degree) between each of clients 110 and each of the available backup policies 1 to M in order to select a more suitable backup policy for a client, thereby optimizing the backup policy selection of clients 110, and meanwhile ensuring the data backup performance of each of the clients 110, such as a recover point objective.

Specifically, in some embodiments, for each of the plurality of clients 110-1 to 110-N, for each of the plurality of available backup policies 1 to M, the computing device 120 may determine the degree of suitability of the available backup policy for the client, to obtain a set of degrees of suitability of the plurality of available backup policies 1 to M for the client. For example, for the client 110-1, the computing device 120 may determine the degree of suitability of the available backup policy 1 for the client 110-1, the degree of suitability of the available backup policy 2 for the client 110-1, . . . , the degree of suitability of the available backup policy M for the client 110-1, thereby obtaining a set of degrees of suitability of the available backup policies 1 to M for the client 110-1. Similarly, the computing device 120 may determine sets of degrees of suitability of these available backup policies 1 to M for the clients 110-2 to 110-N, respectively.

In some embodiments, the computing device 120 may quantify the degree of suitability of a certain backup policy for a certain client using a scoring manner. As an example, Table 1 as below lists example scores of degrees of suitability between different clients 110-1 to 110-N and different available backup policies 1 to M.

TABLE 1

|  | Available backup policy 1 | Available backup policy 2 | Available backup policy 3 | ... |
|---|---|---|---|---|
| Client 110-1 | 100 | 100 | 98 |  |
| Client 110-2 | 0 | 50 | 100 |  |
| Client 110-3 | 0 | 0 | 23 |  |
| ... |  |  |  |  |

In the specific example in Table 1, the score of degree of suitability of the available backup policy 1 for the client 110-1 is 100, the score of degree of suitability of the available backup policy 2 for the client 110-1 is 100, and the score of degree of suitability of the available backup policy 3 for the client 110-1 is 98. The score of degree of suitability of the available backup policy 1 for the client 110-2 is 0, the score of degree of suitability of the available backup policy 2 for the client 110-2 is 50, and the score of degree of suitability of the available backup policy 3 for the client 110-2 is 100. The score of degree of suitability of the available backup policy 1 for the client 110-3 is 0, the score of degree of suitability of the available backup policy 2 for the client 110-3 is 0, and the score of degree of suitability of the available backup policy 3 for the client 110-3 is 23. Among these scores, the score of degree of suitability 100 may indicate that a backup policy is completely suitable for a client, while the score of degree of suitability 0 may indicate that a backup policy is completely unsuitable for a client, and other scores between 0 and 100 may indicate degrees of suitability of different magnitudes.

It should be understood that the specific numerical values shown in Table 1 are merely examples and are not intended to limit the scope of the present disclosure in any way. In other embodiments, the degree of suitability of a backup policy to a client may be represented using any other suitable value, and each backup policy may have any value of the degree of suitability for each client.

After determining a plurality of sets of degrees of suitability of available backup policies 1 to M for the plurality of clients 110-1 to 110-N, the computing device 120 may select the plurality of candidate backup policies 140-1 to 140-N based on the plurality of sets of degrees of suitability. For example, the computing device 120 may select the plurality of candidate backup policies 140-1 to 140-N, so that a sum of degrees of suitability between the plurality of clients 110-1 to 110-N and respective candidate backup policies 140-1 to 140-N is maximized. This means that each client may use the most suitable backup policy, which is favorable to ensure the backup performance of the clients.

However, such a manner of selecting candidate backup policies may result in a great number of clients under a certain backup policy, so that when the backup duration of the backup policy starts, the data backup system 100 may perform data backups for the great number of clients simultaneously. This may affect the balance degree of the load of the data backup system 100 with respect to time.

Therefore, in some embodiments, when determining the plurality of candidate backup policies 140-1 to 140-N, the computing device 120 may select the plurality of candidate backup policies 140-1 to 140-N such that the numbers of clients to which the plurality of available backup policies 1 to M are applied are substantially the same, and meanwhile causing the sum of degrees of suitability between the plurality of clients 110-1 to 110-N and the respective candidate backup policies 140-1 to 140-N to be maximized. In this way, the computing device 120 may improve the load balance of the data backup system 100, while ensuring the backup performance of the clients. As an example, the computing device 120 may obtain the plurality of candidate backup policies 140-1 to 140-N using an augmenting path algorithm of a bipartite graph model. Such an example will be described in detail later with reference to FIG. 3.

In general, the degree of suitability of a certain backup policy for a certain client may be related to various factors of both the backup policy and the client or other parties. For example, these factors may include, but are not limited to, a backup execution time length needed by the client for the data backup to be performed, a degree of business when the client performs the backup, a time window length of the backup policy, a backup start time specified by the backup policy, a system maintenance time window of the data backup system (during which the data backup cannot be performed), an impact caused to other clients by the client using the backup policy, and so on.

Therefore, when determining the degrees of suitability of the available backup policies 1 to M for the plurality of clients 110-1 to 110-N, the computing device 120 may comprehensively take the above factors or other possible factors into account. However, it will be appreciated that the various factors listed above are merely examples and are not intended to limit the scope of the present disclosure in any way. In other embodiments, the computing device 120 may consider any possible factors that may affect the client or other clients when determining the degree of suitability between an available backup policy and a client.

As an example of the factors considered upon determining the degree of suitability of a backup policy for a client, the computing device 120 may determine whether the time window length of the available backup policy is suitable for the backup execution time length of the data backup to be performed by the client. In this manner, the computing device 120 may avoid setting a client with a longer backup execution time length to a backup policy with a shorter backup time window, causing the inability to complete the backup job of the client. In addition, the computing device 120 may also avoid setting a client with a shorter backup execution time length to a backup policy with a longer backup time window, so that the backup time window of the backup policy cannot be used sufficiently.

In particular, for a given client of the clients 110-1 to 110-N, for example, the client 110-1, the computing device 120 may predict the backup execution time length of the client 110-1 based on backup execution historical data of the client 110-1. It will be appreciated that the computing device 120 may predict the backup execution time length of the client 110-1 in any suitable manner. For example, an average time length of the backup execution time lengths of several data backups performed by the client 110-1 recently may be used as the predicted backup execution time length of the client 110-1.

In other embodiments, the computing device 120 may also estimate the backup execution time length of the client 110-1 based on historical data using an Autoregressive Integrated Moving Average (ARMIA) model. The Autoregressive Integrated Moving Average model may include using observed values of a time sequence to predict a value at a future time, and it is substantively a linear regression model. Generally, the model may be determined by the following three parameters: an autoregressive term (AR) P, that is, the observed value at a current time point is determined by the regression of previous P observed values; a moving average (MA) term Q, that is, the observed value at the current time point is determined by the regression of prediction errors at the previous Q time points; and a differential (I) D which refers to a stable sequence obtained after performing Dth-order differential for an input sequence.

After predicting the backup execution time length of the client 110-1, the computing device 120 may determine a matching degree between the backup execution time length and a length of a backup time window of a given available backup policy (for example, the available backup policy 1), to represent the degree of suitability of the available backup policy 1 for the client 110-1. For example, assuming that the backup execution time length of the client 110-1 predicted by the computing device 120 is 2 hours, and the backup time window length of the available backup policy 1 is also 2 hours, the computing device 120 may determine that the matching degree of the two is 100%. Therefore, the available backup policy 1 is completely suitable for the client 110-1. As another example, assuming that the backup execution time length of the client 110-1 predicted by the computing device 120 is 1 hour, and the backup time window length of the available backup policy 1 is 2 hours, the computing device 120 may determine that the matching degree of the two is 50%, and thus the available backup policy 1 is moderately suitable for the client 110-1.

As a further example, assuming that the backup execution time length of the client 110-1 predicted by the computing device 120 is 3 hours, and the backup time window length of the available backup policy 1 is 2 hours, the computing device 120 may determine that the matching degree between the two is 0%, so the available backup policy 1 is completely unsuitable for the client 110-1, because the backup time window length provided by the available backup policy 1 cannot allow the data backup operation of the client 110-1 to complete.

As another example of factors considered in determining the degree of suitability of a backup policy for a client, the computing device 120 may consider the number of available backup policies which cause concurrent backups to be performed when a client is performing a backup. In this manner, the computing device 120 may reduce as much as possible the concurrent data backups of other clients when a certain client performs a data backup, to ensure the data backup performance of the client.

Specifically, in the manner of predicting the backup execution time length of a client described above, based on the backup execution historical data of a given client (for example, the client 110-1) of the clients 110-1 to 110-N, the computing device 120 may predict the backup execution time length of the client 101-1. Then, the computing device 120 may determine a predicted backup execution time period of the client 110-1 based on the backup start time indicated by a given available backup policy (for example, the available backup policy 1) and the predicted backup execution time length of the client 110-1. For example, assuming that the backup execution time length of the client 110-1 predicted by the computing device 120 is 2 hours and the backup start time of the available backup policy 1 is 8 am, the computing device 120 may determine the predicted backup execution time period of the client 110-1 is from 8 am to 10 am.

Afterwards, among the plurality of available backup policies 1 to M, the computing device 120 may determine the number of available backup policies having a backup start time within the determined backup execution time period. For example, continuing the example above, the computing device 120 may determine how many available backup policies specifying a backup start time falling within the time period from 8 am to 10 am. Then, the computing device 120 may cause the determined degree of suitability to be negatively correlated with the above number, when determining the degree of suitability of the available backup policy for the given client.

In other words, continuing the above example, the larger the number of available backup policies causing a backup to be started during the predicted backup time period of the client 110-1 is, the less suitable the available backup policy 1 is for client 110-1. This is because a larger number of available backup policies causing a backup to be started during the predicted backup time period may mean that a larger number of other clients may perform data backups simultaneously while the client 110-1 is performing the data backup. This may reduce the data backup performance of the client 110-1, and may affect the execution of data backups of other clients.

Further referring to FIG. 2, at 220, after determining the candidate backup policies 140-1 to 140-N for the plurality of clients 110-1 to 110-N, the computing device 120 determines an expected load balance degree with respect to time for the data backup system 100 to perform data backups for the plurality of clients 110-1 to 110-N using the plurality of candidate backup policies 140-1 to 140-N, respectively. In other words, computing device 120 assumes that the client 110-1 uses the candidate backup policy 140-1, the client 110-2 uses the candidate backup policy 140-2, . . . , and the client 110-N uses the candidate backup policy 140-N. The computing device 120 then determines the expected load balance degree of the data backup system 100 with respect to time in such a case.

It will be appreciated that the computing device 120 may determine the expected load balance degree in any suitable manner. As an example, the computing device 120 may determine the expected load balance degree based on the total number of backup jobs to be performed by the data backup system 100 in different unit time periods, where each backup job may be used to execute a data backup for a client. For example, assuming that the total number of backup jobs of the data backup system 100 between 9 am and 10 am is 124, and the total number of backup jobs between 10 am and 11 am is only 23, the computing device 120 may determine that the data backup system 100 may have a lower expected load balance degree. As another example, assuming that the total number of backup jobs of the data backup system 100 between 9 am and 10 am is 124, and the total number of backup jobs between 10 am and 11 am is 123, the computing device 120 may determine that the data backup system 100 may have a higher expected load balance degree. In such an analysis manner using unit time periods, the computing device 120 may reduce the computing overhead in determining the expected load balance degree.

Alternatively, in other embodiments, the computing device 120 may simulate a plurality of numbers of concurrent backup jobs of the data backup system 100 at a plurality of time points during use of the plurality of candidate backup policies 140-1 to 140-N, where each backup job is used to perform a data backup for one client of the plurality of clients 110-1 to 110-N. As a specific example, the plurality of numbers of concurrent backup jobs of the data backup system 100 at the plurality of time points determined by the computing device 120 may be shown in Table 2 as below.

TABLE 2

| Timestamp | Number of concurrent jobs |
|---|---|
| 8:00 | 123 |
| 8:05 | 121 |
| 8:10 | 124 |
| 8:15 | 122 |
| ... | |
| 10:00 | 120 |
| ... | |
| 12:25 | 120 |
| 12:30 | 123 |
| ... | |
| 19:25 | 121 |

In the example of Table 2, the computing device 120 may simulate to obtain that the number of concurrent backup jobs of the data backup system 100 at 8:00 is 123, the number of concurrent backup jobs at 8:05 is 121, . . . , the number of concurrent backup jobs at 19:25 is 121, and so on. It should be appreciated that the specific time points and specific values shown in Table 2 are merely examples, and are not intended to limit the scope of the present disclosure in any way. In other embodiments, the computing device 120 may sample any number of concurrent jobs at any time point.

Then, the computing device 120 may determine a standard deviation of the plurality of numbers of concurrent backup jobs obtained by the simulation to represent the expected load balance degree. Since this standard deviation does not actually occur but is predicted, it is also referred to as an expected standard deviation herein. For example, the computing device 120 may calculate the standard deviation of the numbers of concurrent backup jobs shown in the above Table 2. The expected standard deviation may indicate the expected load balance degree of the data backup system 100 when the plurality of clients 110-1 to 110-N use the plurality of candidate backup policies 140-1 to 140-N, respectively. In this way, the computing device 120 may quantitatively and accurately determine the aforementioned expected load balance degree.

In some embodiments, the computing device 120 may use an algorithm implemented by a computer programming language to measure the balance degree of a backup policy to obtain the predicted load balance degree. For example, the basic idea of the algorithm may be that each backup policy is defined using a predetermined start time. When the system time of the data backup system 100 reaches the scheduled start time of a backup policy, the data backup system 100 can generate a backup job for each client included in the backup policy. As time elapses, backup jobs are executed and completed in the data backup system 100. Therefore, the computing device 120 may use the predicted backup job execution time length, the simulated backup system time and the status of backup jobs to obtain a sample of the number of active backup jobs according to the timestamps. Then, the computing device 120 may analyze a dispersion degree of the numbers of active backup jobs, to evaluate the load balance degree of the data backup system 100 when using a plurality of backup policies for a plurality of clients 110-1 to 110-N.

The input of this algorithm may be backup policy objects and client objects. Each backup policy object has a scheduled backup start time, and the backup policy object may include client objects. Each client object has an estimated backup job execution time length. As described above, the computing device 120 may estimate the backup job execution time length of a client using the autoregressive integrated moving average model based on historical data. The output of the algorithm may be a standard deviation value of the numbers of active jobs in recurrence periods.

In some embodiments, the computing device 120 may use a main function written in a computer programming language to evaluate the load balance degree of the data backup system 100 when using a plurality of backup policies for the plurality of clients 110-1 to 110-N. The process to be implemented by the main function may include the following steps. Step 1: a simulated backup start time is set for each client, which may be a predetermined start time of a corresponding backup policy. Step 2: a list of the backup policies are sorted with respect to time according to the scheduled backup start time. Step 3: a simulated backup system time range is defined, which may be from the scheduled backup start time of the first backup policy to the start time of the system maintenance time window of the data backup system 100. Step 4: a simulated time is defined to represent the current time of the data backup system 100 and change the status of the backup jobs. At the same time, the number of active backup jobs is sampled at the current time of the data backup system 100. Step 5: step 4 is repeated until the time of the simulated data backup system 100 reaches the start time of the maintenance time window. Step 6: the standard deviation value of the samples is calculated.

In some embodiments, the computing device 120 may further use a function written in a computer programming language to update the simulated start time of the backup job for each client. In addition, the computing device 120 may further use a function written in a computer programming language to change the status of the backup jobs and the simulated time of the data backup system 100.

Continuing referring to FIG. 2, at 230, the computing device 120 determines an actual load balance degree with respect to time for the data backup system 100, and the actual load balance degree is determined in a case where the data backup system 100 is performing data backups for the plurality of clients 110-1 to 110-N using the plurality of current backup policies 130-1 to 130-N, respectively. It will be understood that similar to determining the expected load balance degree, the computing device 120 may determine the actual load balance degree in any suitable manner.

As an example, the computing device 120 may determine the actual load balance degree based on a total number of backup jobs performed by the data backup system 100 in different unit time periods in the past. For example, assuming that the total number of backup jobs performed by the data backup system 100 between 9 am and 10 am is 124, and the total number of backup jobs between 10 am and 11 am is only 23, the computing device 120 may determine that the data backup system 100 currently has a lower actual load balance degree. As another example, assuming that the total number of backup jobs performed by the data backup system 100 between 9 am and 10 am is 124, and the total number of backup jobs between 10 am and 11 am is 123, the computing device 120 may determine that the data backup system 100 currently has a higher actual load balance degree. Based on the aforementioned analysis, the computing device 120 may reduce the calculation overhead for determining the actual load balance degree.

Alternatively, in other embodiments, the computing device 120 may determine a plurality of numbers of concurrent backup jobs of the data backup system 100 at a plurality of historical time points during use of the plurality of current backup policies 130-1 to 130-N, based on backup execution historical data of the data backup system 100, where each backup job is used to perform a data backup for one client of the plurality of clients 110-1 to 110-N. As a specific example, the plurality of numbers of concurrent backup jobs of the data backup system 100 at the plurality of time points determined by the computing device 120 may be shown in Table 3 as below.

TABLE 3

| Timestamp | Number of concurrent jobs |
|---|---|
| 8:00 | 108 |
| 8:05 | 106 |
| 8:10 | 106 |
| 8:15 | 105 |
| ... | |
| 10:00 | 23 |
| ... | |
| 12:25 | 230 |
| 12:30 | 228 |
| ... | |
| 19:25 | 2 |

As shown in Table 3, the computing device 120 may obtain from the historical data that the number of actual concurrent backup jobs of the data backup system 100 at 8:00 is 108, the number of actual concurrent backup jobs at 8:05 is 106, . . . , the number of actual concurrent backup jobs at 19:25 is 2, and so on. It should be appreciated that the specific time points and specific values shown in Table 3 are merely examples, and are not intended to limit the scope of the present disclosure in any way. In other embodiments, the computing device 120 may have any number of concurrent jobs at any time point.

Then, the computing device 120 may determine the standard deviation (also referred to as the actual standard deviation) of the plurality of numbers of concurrent backup jobs obtained from the historical data, to represent the actual load balance degree. For example, the computing device 120 may calculate the standard deviation of the numbers of respective concurrent jobs in Table 3 above. The actual standard deviation may indicate the actual load balance degree of the data backup system 100 in a case where the plurality of clients 110-1 to 110-N use the plurality of current backup policies 130-1 to 130-N. In this way, the computing device 120 may quantitatively and accurately determine the actual load balance degree.

Continuing referring to FIG. 2, at 240, based on a comparison of the expected load balance degree as determined and the actual load balance degree as determined, the computing device 120 selects, between the plurality of candidate backup polices 140-1 to 140-N and the plurality of current backup policies 130-1 to 130-N, a plurality of backup policies to be used for the plurality of clients 110-1 to 110-N, respectively.

For example, if the computing device 120 determines that the expected load balance degree of the data backup system 100 is greater than the actual load balance degree, the computing device 120 may use the plurality of candidate backup policies 140-1 to 140-N to replace the plurality of current backup policies 130-1 to 130-N, to perform data backups for the plurality of clients 110-1 to 110-N, respectively. On the other hand, if the computing device 120 determines that the expected load balance degree of the data backup system 100 is not greater than the actual load balance degree, the computing device 120 may continue to use the plurality of current backup policies 130-1 to 130-N to perform data backups for the plurality of clients 110-1 to 110-N, respectively.

As mentioned above, in some embodiments, on the basis of a plurality of sets of degrees of suitability of the plurality of available backup policies 1 to M for the plurality of clients 110-1 to 110-M, the computing device 120 may use an augmenting path algorithm of a bipartite graph model to determine a plurality of optimized candidate backup policies 140-1 to 140-N. In this manner, the computing device 120 may optimize the selection of the plurality of candidate backup policies 140-1 to 140-N, thereby improving the efficiency and accuracy in determining the optimized candidate backup policies 140-1 to 140-N. A specific example of such a manner is described below with reference to FIG. 3.

Figure 3:
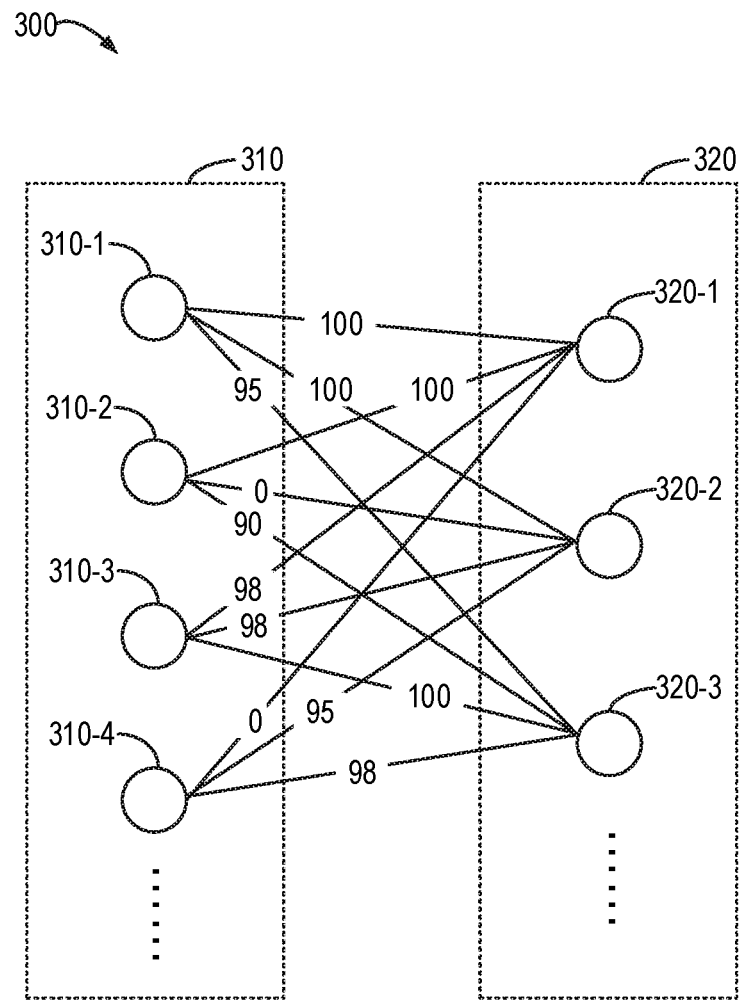
FIG. 3 illustrates a schematic diagram of a bipartite graph model for determining a candidate backup policy according to an embodiment of the present disclosure.

FIG. 3 illustrates a schematic diagram of a bipartite graph model 300 for determining the candidate backup policies 140 according to an embodiment of the present disclosure. As shown in FIG. 3, the plurality of clients 110-1 to 110-N may be represented as a client node set 310 in the bipartite graph model 300, which may include a client node 310-1 corresponding to the client 110-1, a client node 310-2 corresponding to the client 110-2, a client node 310-3 corresponding to the client 110-3, a client node 310-4 corresponding to the client 110-4, and so on.

Similarly, the plurality of available backup policies 1 to M of the data backup system 100 may be represented as a backup policy node set 320 in the bipartite graph model 300, which may include a backup policy node 320-1 corresponding to the available backup policy 1, a backup policy node 320-2 corresponding to the available backup policy 2, a backup policy node 320-3 corresponding to the available backup policy 3, and so on.

A numerical value on the connection line between each of the client nodes 310 and each of the backup policy nodes 320 indicates a score of a degree of suitability of the backup policy for the client. It will be appreciated that the specific numerical values shown in FIG. 3 are merely examples and are not intended to limit the scope of the present disclosure in any way. In other embodiments, there may be any score of degree of suitability between any client node of the client nodes 310 and any backup policy node of the backup policy nodes 320.

Continuing with the discussion of the example in FIG. 3, the number of clients to be matched is N (the clients 110-1 to 110-N) and the number of backup policies is M (the available backup policies 1 to M). Each client has a score of degree of suitability corresponding to each backup policy. An N×M matrix may be used to represent the scores of degrees of suitability between the N clients and the M backup policies, for example, $$\begin{pmatrix} 100 & \cdots & 0 \\ \vdots & \ddots & \vdots \\ 53 & \cdots & 95 \end{pmatrix}.$$

In addition, for the client node set 310 and the backup policy set 320, there are also some constraint conditions. For example, one client node can only be matched with one backup policy node, and one backup policy node can be matched with a plurality of client nodes. The numbers of matched client nodes for respective backup policy nodes should be the same as much as possible. The final matching result may need to ensure that a sum of the matching degrees between all matched clients and the matched backup policies is maximized. The input of the algorithm is a two-dimensional array composed of each weight value (namely, a score of the degree of suitability) of each client node corresponding to each backup policy node. The output to be obtained by the algorithm is an array of matching pairs between the client nodes and the backup policy nodes.

The process of selecting the candidate backup policies 140 through the augmenting path algorithm of the bipartite graph model may be described as follows. First, a bipartite graph is created, where one subset contains all the client nodes and the other subset contains all the backup policy nodes. In addition, a maximum matching capacity, namely, a maximum number of client nodes that each backup policy node can match, is set for each backup policy node.

Then, a maximum weight value is found for each client node. For example, the weight values of a client node versus three backup policy nodes (assuming that only three backup policy nodes exist in the bipartite graph) is 100, 93 and 80. Then, the method of "setting a benchmark for the maximum weight value" may be used to find the maximum weight value 100 and store it in the corresponding client node as the benchmark. The value of the benchmark of the backup policy node is initialized to 0. This is because if a matching result 100 is returned now, this may cause matched client nodes of some backup policy nodes to exceed the maximum matching capacity value, which is not a desirable result. Therefore, the matching may be adjusted by looking for an augmenting path.

Then, all the backup policy nodes are traversed for each client node. If the sum of the benchmark value of a certain backup policy node and the benchmark value of this client node is their weight value, and the capacity of the corresponding policy node is sufficient, then their matching relationship is saved. If the capacity of the backup policy node is not enough, it is determined whether a client node may be found from all the client nodes that have been matched to this policy node, which client node can be matched to another policy node and the matching weight value remains unchanged. This is because it is possible that one client node has the same weight values for a plurality of policy nodes. This process may be referred to as finding an augmenting path. It may also occur that the augmenting path cannot be found, and the capacity limit of the policy node is exceeded. At this time, the method provided below may be used to replace an already-matched client node.

Specifically, the replaced client node must make the already existing total weight value decrease in the least amount. This process is achieved by a method of "finding the minimum decreased matching weight." First, a minimum decay value is found, then the sum of the benchmark values of the already visited client node and the backup policy node is decreased, and the amount of the decrease is the minimum decay value. In the case of already visited client node and backup policy node, the sum of two benchmark values is the same as the original, but the previous step is repeated for the node not visited. As such, the augmenting path may be found. Then, the matching result of the client nodes and the backup policy nodes is adjusted. If the augmenting path still cannot be found, then the matching weight is again to be decreased by the minimum decay value, until the augmenting path can be found.

In some embodiments, the computing device 120 may use a main function written in a computer programming language to find the greatest matching weight in the bipartite graph. The process to be implemented by the main function may include the following steps. Step 1: a maximum weight value is found as the benchmark for each client node. Step 2: for each client node, an attempt is made to find an augmenting path. In the augmenting path, if the sum of the benchmark values of the client node and backup policy node associated with each other is the greatest and the backup policy node has a sufficient capacity, the two nodes are marked as a matching pair. Otherwise, if the backup policy node does not have a sufficient capacity, an attempt is made to find a path from the matched client nodes until all the backup policy nodes are tried. Step 3: if the augmenting path is not found, an attempt is made to find the minimum decreased benchmark value for the client nodes that have been visited and the backup policy nodes that have not been visited according to the weight definition. Finally, the benchmark value is adjusted for the visited client nodes and backup policy nodes to ensure that a valid subgraph (composed of matching pairs) has the greatest benchmark value. Step 4: step 2 is repeated to find the augmenting path until all the client nodes have been matched.

In some embodiments, the computing device 120 may further use a function written in a computer programming language to assign a maximum weight to the client node as the benchmark. In addition, in some embodiments, the computing device 120 may further use a function written in a computer programming language to find the augmenting path, and if the augmenting path is found, the matching pair is updated. In addition, if the augmenting path is not found, the computing device 120 may use a function written in a computer programming language to find the minimum decreased weight value of the visited client node and the unvisited backup policy node, and the benchmark value is adjusted for the nodes in the current subgraph.

Figure 4:
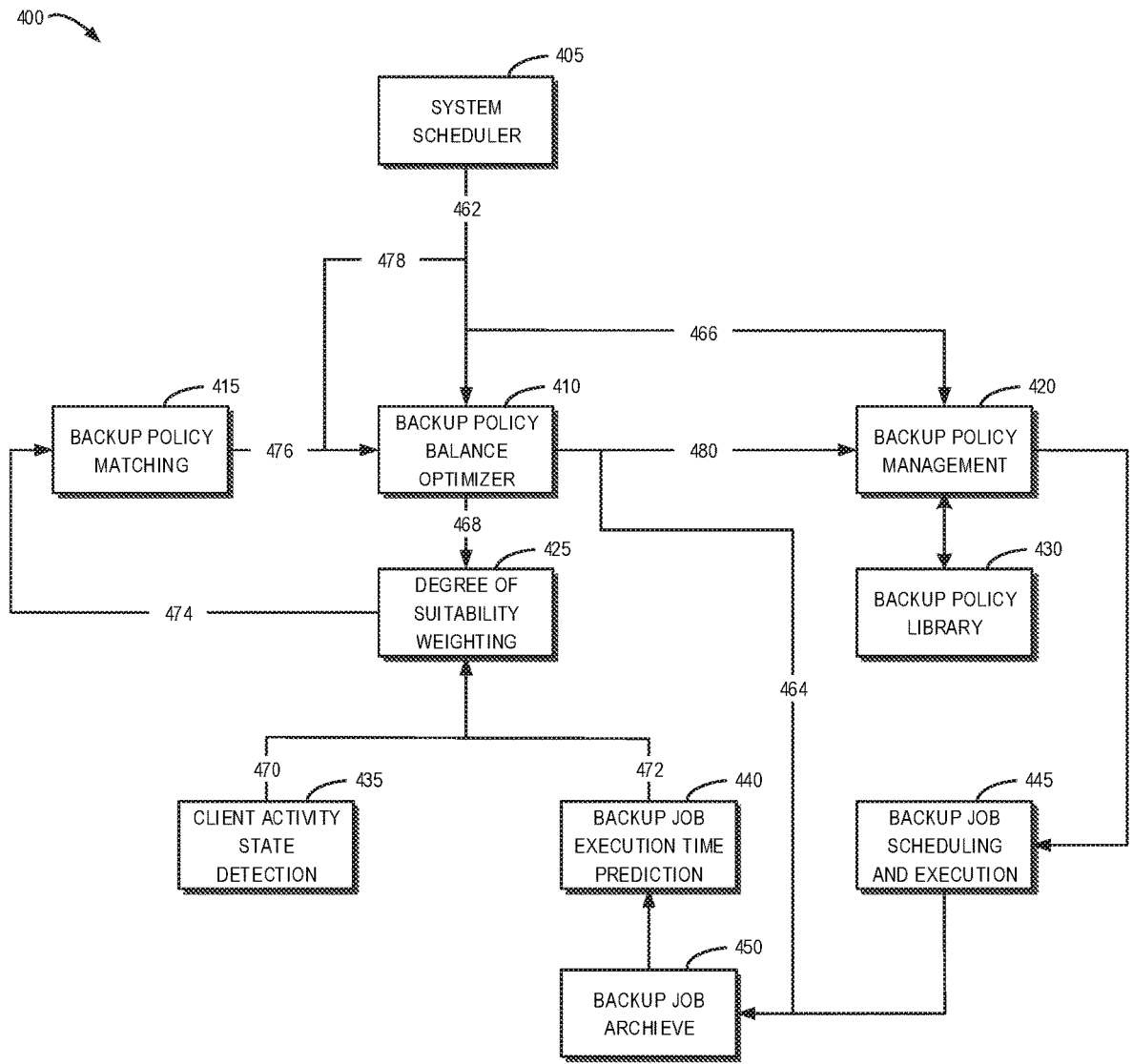
FIG. 4 illustrates a modular system architecture for performing backup policy dynamic optimization according to an embodiment of the present disclosure.

FIG. 4 illustrates a modular system architecture 400 for performing backup policy dynamic optimization according to an embodiment of the present disclosure. It should be understood that the system architecture 400 with various modules shown in FIG. 4 may be considered as a specific implementation of the computing device 120 of FIG. 1. Accordingly, the various modules of the system architecture 400 depicted herein are merely examples and are not intended to limit the scope of the present disclosure in any way. In other embodiments, the computing device 120 may employ any other suitable system architecture, which may include more or fewer modules, or include modules different from the modules as shown.

As shown in FIG. 4, the system architecture 400 may include a system scheduler module 405, a backup policy balance optimizer module 410, a backup policy matching module 415, a backup policy management module 420, a suitability degree weighting module 425, a backup policy library 430, a client activity state detection module 435, a backup job execution time length prediction module 440, a backup job scheduling and execution module 455, and a backup job archive module 450. In some embodiments, the system scheduler module 405 may be configured to control the scheduling of the data backup system, the backup policy balance optimizer module 410 may be configured to optimize a balance degree of backup policies of the data backup system, and the backup policy matching module 415 may be configured to match available backup policies with different clients.

In addition, the backup policy management module 420 may be configured to manage the backup policies, the suitability degree weighting module 425 may be configured to calculate the degree of suitability of a backup policy for a client, the backup policy library 430 may be configured to store various backup policies, the client activity state detection module 435 may be configured to detect the activity state of a client, the backup job execution time length prediction module 440 may be configured to predict the execution time length of a backup job of a client, the backup job scheduling and execution module 455 may be configured to schedule and execute a backup job for a client, and the backup job archive module 450 may be configured to archive various information of the executed backup jobs.

In some embodiments, in order to perform the dynamic optimization of the backup policies, the system scheduler module 405 may trigger 462 the backup policy balance optimizer module 410 to dynamically balance the clients under the backup policies at a regular interval. Next, the backup policy balance optimizer module 410 may evaluate 464 the current backup policy balance degree, that is, the current load balance degree of the data backup system using the current backup policies. To this end, the backup policy balance optimizer module 410 may obtain historical records of backup job executions from the backup job archive module 450, and sample the numbers of concurrent jobs according to time points in the previous recurrence period.

For example, for all the backup policies that run on a daily basis, the data backup system may sort the backup policies according to the scheduled backup start time points. Then, the data backup system may measure the numbers of concurrent backup jobs at a regular interval (for example, 5 minutes) based on the status of the backup jobs (from the first backup policy to the last policy). Finally, the data backup system may obtain the sample data as shown in Table 3 above.

Then, the backup policy balance optimizer module 410 may calculate a standard deviation of all the samples, and use the standard deviation to measure the load balance degree of the data backup system using the current backup policies for respective clients. Next, the backup policy balance optimizer module 410 may obtain 466 all the backup policy definitions from the backup policy management module 420, and classify the backup policies according to the recurrence periods, the scheduled backup start times and the backup time windows of the backup policies. Then, the backup policy balance optimizer module 410 may transfer 468 the backup policy types, the recurrence periods, the backup time windows, the scheduled times and the clients to be applied to the suitability degree weighting module 425.

Then, the suitability degree weighting module 425 may obtain 470 an active or online time period of the clients from the client activity state detection module 435, and obtain 472 the backup job execution time lengths of the clients from the backup job execution time prediction module 440. Next, the suitability degree weighting module 425 calculates the matching degree of each client versus each backup policy, and transfers 474 a matching degree matrix to the backup policy matching module 415. For example, the matching degree matrix may have the form as shown in Table 1 above.

Then, the backup policy matching module 415 may assign all the clients to different backup policies, to maximize the sum of the matching degrees and ensure that the numbers of clients under respective backup policy are the same as much as possible. Next, the backup policy matching module 415 may transfer 476 the simulated matching result to the backup policy balance optimizer module 410. Then, the backup policy balance optimizer module 410 may calculate 478 the simulated backup policy balance degree based on the simulation of the execution of the backup jobs. Next, the backup policy balance optimizer module 410 may compare the simulated load balance degree with the existing actual load balance degree. If the simulated load balance degree value is greater than the actual load balance degree, the backup policy balance optimizer module 410 may notify 480 the backup policy management module 420 to re-assign the clients to different backup policies according to the simulation result.

The improvement to the traditional solutions by the embodiments of the present disclosure has been verified through simulations. For example, in an example simulation, 10 backup policies are randomly generated, and several clients are randomly assigned to each backup policy. In addition, a predicted execution time length may be randomly assigned to each client. Relevant simulation results are shown in FIG. 5A and FIG. 5B.

Figures 5A, 5B:
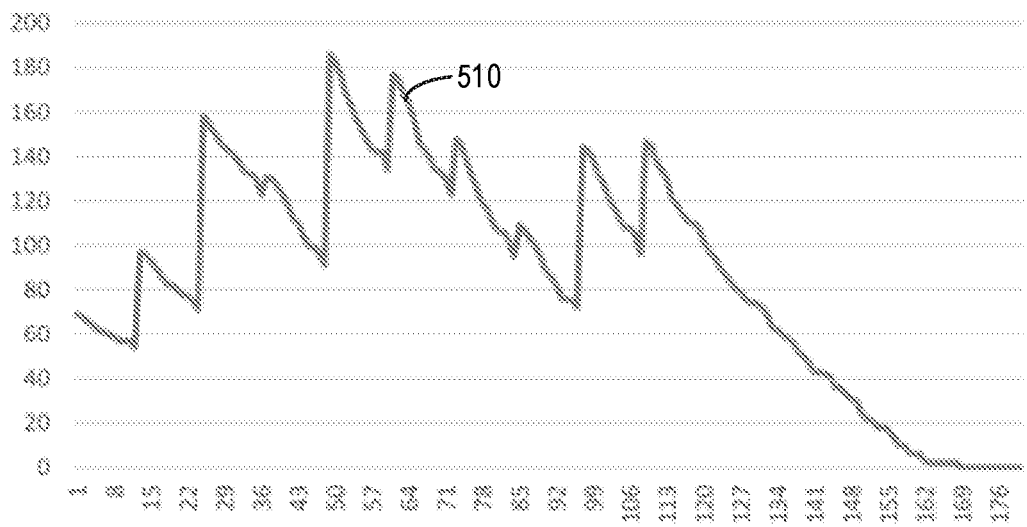
FIG. 5A illustrates a simulated sampling result of the number of concurrent backup jobs with a traditional backup policy setting manner.
FIG. 5B illustrates a simulated sampling result of the number of concurrent backup jobs with a backup policy dynamic optimization manner according to an embodiment of the present disclosure.

FIG. 5A illustrates a simulated sampling result of the number of concurrent backup jobs with a traditional backup policy setting manner. In FIG. 5A, the horizontal axis represents indexes of samples sampled at different time points, and the vertical axis represents the number of concurrent backup jobs. The curve 510 represents a curve that the number of concurrent backup jobs varies with the samples sampled at different time points using the traditional backup policy setting manner.

FIG. 5B illustrates a simulated sampling result of the number of concurrent backup jobs with a backup policy dynamic optimization manner according to an embodiment of the present disclosure. In FIG. 5B, the horizontal axis represents the indexes of samples sampled at different time points, and the vertical axis represents the number of concurrent backup jobs. The curve 520 represents a curve that the number of concurrent backup jobs varies with the samples sampled at different time points with the backup policy dynamic optimization manner according to an embodiment of the present disclosure.

It may be determined from the simulation results shown in FIG. 5A and FIG. 5B that the standard deviation of the numbers of concurrent backup jobs with the traditional backup policy setting manner is approximately 50.6 (FIG. 5A), and the standard deviation of the numbers of concurrent backup jobs with the backup policy dynamic optimization manner according to an embodiment of the present disclosure is improved to about 40.7 (FIG. 5B). Therefore, the method for optimizing the backup policy proposed in the embodiments of the present disclosure may significantly improve the balance degree of the numbers of concurrent backup jobs of the data backup system at different time points, and meanwhile ensure the backup performance of the clients, such as the recover point objective.

Figure 6:
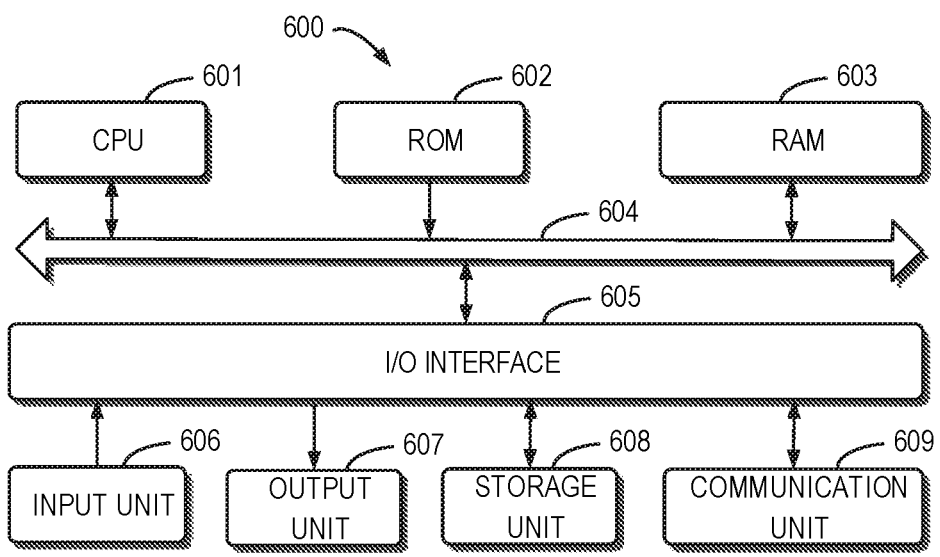
FIG. 6 illustrates a schematic block diagram of a device that may be used to implement embodiments of the present disclosure.

FIG. 6 illustrates a block diagram of a device 600 adapted to implement the embodiments of the present disclosure. In some embodiments, the device 600 may be an electronic device which may be used to implement the computing device 120. As shown in FIG. 6, the device 600 comprises a central processing unit (CPU) 601 that may perform various appropriate actions and processing based on computer program instructions stored in a read-only memory (ROM) 602 or computer program instructions loaded from a memory unit 608 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

Various components in the device 600 are connected to the I/O interface 605, including: an input unit 606 such as a keyboard, a mouse and the like; an output unit 607 including various kinds of displays and a loudspeaker, or the like; a storage unit 608 including a magnetic disk, an optical disk, or the like; a communication unit 609 including a network card, a modem, and a wireless communication transceiver, or the like. The communication unit 609 allows the device 600 to exchange information/data with other devices through a computer network such as the Internet and/or various kinds of telecommunications networks.

Various processes and processing described above, for example, method 200, may be executed by the processing unit 601. For example, in some embodiments, the method 200 may be implemented as a computer software program that is tangibly contained in a machine readable medium, for example, the storage unit 608. In some embodiments, part or the entire computer program may be loaded and/or mounted onto the device 600 via ROM 602 and/or communication unit 609. When the computer program is loaded to the RAM 603 and executed by the CPU 601, one or more steps of the at least one of the method 200 as described above may be executed.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

As used herein, the term "determining" covers a wide variety of actions. For example, "determining" may include operation, computing, processing, exporting, investigating, looking up (for example, looking up in a table, database, or another data structure), ascertaining, and the like. Further, "determining" may include receiving (for example, receiving information), accessing (for example, accessing data in a memory), and the like. Further, "determining" may include parsing, choosing, selecting, establishing, and the like.

It should be noted that, the embodiments of the present invention can be implemented in software, hardware or the combination thereof. The hardware part can be implemented by a special logic; the software part can be stored in a memory and executed by a proper instruction execution system such as a microprocessor or a design-specific hardware. Those skilled in the art may understand that the above apparatus and method may be implemented with a computer-executable instruction and/or in a processor controlled code, for example, such code is provided on a programmable memory or a data bearer such as an optical or electronic signal bearer.

In addition, although operations of the method of the present method are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution. It should also be noted that features and functions of two or more devices in accordance with the present disclosure may be embodied in one device.

Conversely, the features and functions of one device described above can be further divided into a plurality of devices.

Although the present disclosure has been depicted with reference to a plurality of embodiments, it should be understood that the present invention is not limited to the disclosed embodiments. The present disclosure intends to cover various modifications and equivalent arrangements included in the spirit and scope of the appended claims.

We claim:

1. A method of backup management, comprising:
   determining a plurality of candidate backup policies for a plurality of clients of a data backup system;
   determining an expected load balance degree for the data backup system to perform data backups for the plurality of clients using the plurality of candidate backup policies, wherein determining the expected load balance degree comprises:
      simulating a plurality of concurrent backup jobs of the data backup system at a plurality of time points during use of the plurality of candidate backup policies; and
      determining an expected standard deviation of the plurality of concurrent backup jobs, wherein the expected load balance degree is based on the expected standard deviation;
   determining an actual load balance degree for the data backup system while the data backup system is performing the data backups for the plurality of clients using a plurality of current backup policies; and
   selecting, between the plurality of candidate backup polices and the plurality of current backup policies, a plurality of backup policies to be used for the plurality of clients, based on a comparison of the expected load balance degree and the actual load balance degree.

2. The method of claim 1, wherein determining the plurality of candidate backup policies comprises:
   for each of a plurality of available backup policies, determining a degree of suitability of the available backup policy for a client of the plurality of clients, to obtain a set of degrees of suitability of the plurality of available backup policies for the client; and
   selecting the plurality of candidate backup policies based at least on the sets of degrees of suitability for the client.

3. The method of claim 2, wherein determining the degree of suitability comprises:
   for the client:
      predicting a backup execution time length for the client based on backup execution historical data of the client; and
      determining a matching degree between the backup execution time length and a length of a backup time window of an available backup policy of the plurality of available backup policies.

4. The method of claim 2, wherein determining the degree of suitability comprises:
   predicting a backup execution time length for the client based on backup execution historical data of the client;
   determining a backup execution time period of using an available backup policy of the plurality of available backup policies for the client based on a backup start time indicated by the available backup policy and the backup execution time length for the client;
   determining, from the plurality of available backup policies, a number of available backup policies with a backup start time within the backup execution time period; and
   modify the degree of suitability based on the number.

5. The method of claim 2, wherein selecting the plurality of candidate backup policies comprises:
   obtaining the plurality of candidate backup policies using an augmenting path algorithm of a bipartite graph model.

6. The method of claim 1, wherein determining the actual load balance degree comprises:
   identifying a plurality of concurrent backup jobs of the data backup system at a plurality of historical time points during use of the plurality of current backup policies based on backup execution historical data of the data backup system; and
   determining an actual standard deviation of the plurality of concurrent backup jobs, wherein the actual load balance degree is based on the actual standard deviation.

7. An electronic device, comprising:
   at least one processor; and
   at least one memory storing computer program instructions, the at least one memory and the computer program instructions being configured, with the at least one processor, to cause the electronic device to:
      determine a plurality of candidate backup policies for a plurality of clients of a data backup system;
      determine an expected load balance degree for the data backup system to perform data backups for the plurality of clients using the plurality of candidate backup policies, wherein determining the expected load balance degree comprises:
         simulating a plurality of concurrent backup jobs of the data backup system at a plurality of time points during use of the plurality of candidate backup policies; and
         determining an expected standard deviation of the plurality of concurrent backup jobs, wherein the expected load balance degree is based on the expected standard deviation;
      determine an actual load balance degree for the data backup system while the data backup system is performing the data backups for the plurality of clients using a plurality of current backup policies; and
      select, between the plurality of candidate backup polices and the plurality of current backup policies, a plurality of backup policies to be used for the plurality of clients, based on a comparison of the expected load balance degree and the actual load balance degree.

8. The electronic device of claim 7, wherein the at least one memory and the computer program instructions are configured, with the at least one processor, to cause the electronic device to determine the plurality of candidate backup policies by:
   for each of a plurality of available backup policies, determining a degree of suitability of the available backup policy for a client of the plurality of clients, to obtain a set of degrees of suitability of the plurality of available backup policies for the client; and
   selecting the plurality of candidate backup policies based at least on the sets of degrees of suitability for the client.

9. The electronic device of claim 8, wherein the at least one memory and the computer program instructions are configured, with the at least one processor, to cause the electronic device to determine the degree of suitability by:
   for the client:
      predicting a backup execution time length for the client based on backup execution historical data of the client; and
      determining a matching degree between the backup execution time length and a length of a backup time window of an available backup policy of the plurality of available backup policies.

10. The electronic device of claim 8, wherein the at least one memory and the computer program instructions are configured, with the at least one processor, to cause the electronic device to determine the degree of suitability by:
   predicting a backup execution time length for the client based on backup execution historical data of the client;
   determining a backup execution time period of using an available backup policy of the plurality of available backup policies for the client based on a backup start time indicated by the available backup policy and the backup execution time length for the client;
   determining, from the plurality of available backup policies, a number of available backup policies with a backup start time within the backup execution time period; and
   modify the degree of suitability to be negatively correlated with the number.

11. The electronic device of claim 8, wherein the at least one memory and the computer program instructions are configured, with the at least one processor, to cause the electronic device to select the plurality of candidate backup policies by:
   obtaining the plurality of candidate backup policies using an augmenting path algorithm of a bipartite graph model.

12. The electronic device of claim 7, wherein the at least one memory and the computer program instructions are configured, with the at least one processor, to cause the electronic device to determine the actual load balance degree by:
   identifying a plurality of concurrent backup jobs of the data backup system at a plurality of historical time points during use of the plurality of current backup policies based on backup execution historical data of the data backup system; and
   determining an actual standard deviation of the plurality of concurrent backup jobs, wherein the actual load balance degree is based on the actual standard deviation.

13. A non-transitory computer readable medium comprising machine-executable instructions, which when executed by a computer processor, enables the computer processor to perform a method, the method comprising:
   determining a plurality of candidate backup policies for a plurality of clients of a data backup system;
   determining an expected load balance degree for the data backup system to perform data backups for the plurality of clients using the plurality of candidate backup policies, wherein determining the expected load balance degree comprises:
      simulating a plurality of concurrent backup jobs of the data backup system at a plurality of time points during use of the plurality of candidate backup policies; and
      determining an expected standard deviation of the plurality of concurrent backup jobs, wherein the expected load balance degree is based on the expected standard deviation;
   determining an actual load balance degree for the data backup system while the data backup system is performing the data backups for the plurality of clients using a plurality of current backup policies; and
   selecting, between the plurality of candidate backup policies and the plurality of current backup policies, a plurality of backup policies to be used for the plurality of clients based on a comparison of the expected load balance degree and the actual load balance degree.

14. The non-transitory computer readable medium of claim 13, wherein determining the plurality of candidate backup policies comprises:
   for each of a plurality of available backup policies, determining a degree of suitability of the available backup policy for a client of the plurality of clients, to obtain a set of degrees of suitability of the plurality of available backup policies for the client; and
   selecting the plurality of candidate backup policies based at least on the sets of degrees of suitability for the client.

15. The non-transitory computer readable medium of claim 14, wherein determining the degree of suitability comprises:
   for the client:
      predicting a backup execution time length for the client based on backup execution historical data of the client; and
      determining a matching degree between the backup execution time length and a length of a backup time window of an available backup policy of the plurality of available backup policies.

16. The non-transitory computer readable medium of claim 14, wherein determining the degree of suitability comprises:
   predicting a backup execution time length for the client based on backup execution historical data of the client;
   determining a backup execution time period of using an available backup policy of the plurality of available backup policies for the client based on a backup start time indicated by the available backup policy and the backup execution time length for the client;
   determining, from the plurality of available backup policies, a number of available backup policies with a backup start time within the backup execution time period; and
   modify the degree of suitability to be negatively correlated with the number.

17. The non-transitory computer readable medium of claim 14, wherein selecting the plurality of candidate backup policies comprises:
   obtaining the plurality of candidate backup policies using an augmenting path algorithm of a bipartite graph model.

* * * * *